March 6, 1928.
E. WANDERSLEB
1,661,279
MOUNT FOR PHOTOGRAPHIC OBJECTIVES
Filed June 1, 1927
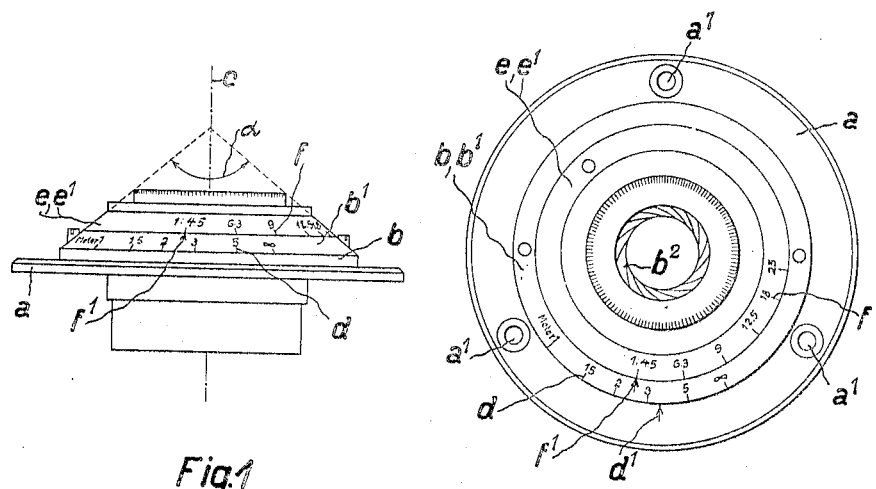
Fig.1
Fig.2
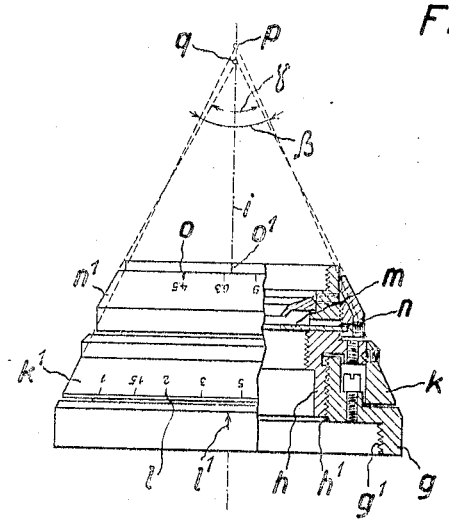
Fig.3
Inventor:

Patented Mar. 6, 1928.

1,661,279

UNITED STATES PATENT OFFICE.

ERNST WANDERSLEB, OF JENA, GERMANY, ASSIGNOR TO THE FIRM CARL ZEISS, OF JENA, GERMANY.

MOUNT FOR PHOTOGRAPHIC OBJECTIVES.

Application filed June 1, 1927, Serial No. 195,840, and in Germany July 5, 1926.

The mounts for photographic objectives, which are destined for use on cameras with invariable extension and which for focussing the distance, appertaining to an object to be photographed, of the sensitive layer from the objective are displaceable in the direction of their optical axis and which are furthermore provided with an iris-diaphragm for varying the aperture, are generally provided with two scales by means of which the distance-values and the values of the relative aperture can be adjusted on two indices and read off. The scales are generally disposed on surfaces which lie in planes perpendicular to the objective axis or on the surfaces of circular cylinders whose axes coincide with the objective axis, whereby these surfaces appertain to the surface of rings, rotatable on the mount about the objective axis. In order to be able to adjust and read off the respective values on the appertaining indices it is necessary to always bring the eye into the same position relatively to the mount, i. e. approximately into the optical axis in front of the objective and laterally of the optical axis above the objective respectively.

The present invention relates to a mount of the aforesaid kind for photographic objectives in which the adjustment and reading of the respective values can take place from each of the two positions of the eye or from an optional intermediate position. This advantage is attained by disposing the scales according to the invention on parts of circular conical surfaces which are provided on the rings. These conical surfaces are suitably so chosen that their points lie on the object-side part of the axis of the objective, viz, at a point thereof or at two different points whose positions only differ little from each other, and that the conical angles are equally large or at least almost equally large. The scales are therefore located on conical surfaces, both of which are either parts of the same cone or of two cones only slightly differing from each other.

In order to obtain with the said different positions of the eye as far as possible a uniformly satisfactory reading it is suitable to choose the conical surfaces in such a way that with a medium position of the eye the visual direction is about perpendicular to the conical surface. Such is the case by imparting to the conical angles a magnitude of about 90°. However, in the case of very small objectives, as used for cinematographic purposes and the like, this selection leads to an undesirable increase of the total diameter of the mount if one simultaneously demands for the divisions and the numerals disposed thereon a size which affords an easy reading of the divisional values without resorting to a magnifying optical means. In this case it is advisable to render the conical angles smaller than 90° each in order to have at one's disposal a comparatively broad, conical ring surface for the adaptation of the numbered scale.

The annexed drawing shows two constructional examples of the present invention. Fig. 1 represents the first example, viz, a so-called sunk mount for objectives in an elevation, Fig. 2 in a plan. The second example, viz, a focussing mount for small objectives is shown in Fig. 3 on a greatly enlarged scale in an elevation, partly in a cross section.

The first example (Figs. 1 and 2) shows an objective mount which is provided with a fastening plate $a$ with screw-holes $a^1$. The mount has a ring $b$ for focussing the objective on the object to be photographed. This ring $b$ is rotatable about the axis $c$ of the objective and carries on a conical surface $b^1$ a distance-scale $d$ to which appertains an index $d^1$ fixed on the fastening plate $a$. On the mount rotates about the axis $c$ a second ring $e$ which carries a scale of diaphragms $f$ on a conical surface $e^1$ and which is used for varying the aperture of an iris-diaphragm $b^2$. To the scale $f$ there appertains an index $f^1$ fixed on the ring $b$. The conical surfaces $b^1$ and $e^1$ are parts of a cone whose point lies on the axis $c$ and which has a conical angle $\alpha$, being a little larger than 90°.

The objective-mount represented as the second example (Fig. 3) has a fastening ring $g$ provided with a thread $g^1$ on which the mount proper, consisting of a tube $h$, is displaceable by means of a thread $h^1$ in the direction of its axis $i$. In order to carry out such displacements there is fixed on the tube $h$ a ring $k$ carrying on its conical surface $k^1$ a distance-scale $l$ to which appertains an index $l^1$ fixed on the fastening ring $g$. In the tube $h$ is further disposed in a well-known way an iris-diaphragm $m$ which may be adjusted by a ring $n$ rotatable about the axis $i$ of the mount. This ring $n$ whose surface has a conical part $n^1$, carries on this part $n^1$ a scale of stops $o$ to which appertains an index $o^1$ fixed on the tube $h$. The conical surfaces $k^1$ and $n^1$ are parts of circular cones whose points lie at points $p$ and $q$, being only slightly apart, of the axis $i$. The conical angles $\beta$ and $\gamma$ only differ little from each other and from 60°.

When using the objective the adjustment of the mounts, described as examples of the invention, takes place in the usual, well-known manner by rotating the rings $b$ and $e$ and $k$ and $n$ respectively. Owing to the arrangement of the scales $d$ and $f$ and $l$ and $o$ respectively on conical surfaces, the eye of the user may be both in front of the objective on the axis $c$ and $i$ respectively, and at a point lateral thereof.

I claim:

1. Mount for objectives adapted to be fastened on a camera, comprising a tube adapted to receive optical elements of the objective, means for displacing this tube in the direction of its axis, these means comprising a ring, rotatable about the axis of the said tube, a scale fitted on this ring, and an index coacting with this scale, an iris-diaphragm and a second ring, rotatable about the axis of the mount and adapted to vary the aperture of the diaphragm, a second scale, fitted to this second ring and a second index coacting with this second scale, the surfaces of the said two rings containing parts of conical surfaces, on each of which there is disposed one of the said two scales, the points of the said conical surfaces lying on at least almost the same point of the object-side part of the axis of the mount and the angles on the tops of the said conical surfaces being at least almost of the same size.

2. Mount for objectives adapted to be fastened on a camera, comprising a tube adapted to receive optical elements of the objective, means for displacing this tube in the direction of its axis, these means comprising a ring rotatable about the axis of the said tube, a scale fitted on this ring, and an index coacting with this scale, an iris-diaphragm and a second ring, rotatable about the axis of the mount and adapted to vary the aperture of the diaphragm, a second scale, fitted to this second ring and a second index coacting with this second scale, the surfaces of the said two rings containing parts of conical surfaces, on each of which there is disposed one of the said two scales, the points of the said conical surfaces lying on at least almost the same point of the object-side part of the axis of the mount and the angles on the tops of the said conical surfaces being at least almost of the same size and smaller than 90° each.

ERNST WANDERSLEB.